(12) United States Patent
Kanda (10) Patent No.: US 7,992,185 B2
(45) Date of Patent: Aug. 2, 2011

(54) RECEIVER AND RECEIVING METHOD AND PROGRAM

(75) Inventor: Satoshi Kanda, Tokyo (JP)

(73) Assignee: Sony Corporation (JP)

( * ) Notice: Subject to any disclaimer, the term of this patent is extended or adjusted under 35 U.S.C. 154(b) by 1062 days.

(21) Appl. No.: 10/935,169

(22) Filed: Sep. 7, 2004

(65) Prior Publication Data

US 2005/0084038 A1 Apr. 21, 2005

(30) Foreign Application Priority Data

Sep. 8, 2003 (JP) .................................. 2003-314948

(51) Int. Cl.
*H04N 7/16* (2011.01)
(52) U.S. Cl. .............. 725/142; 725/37; 725/47; 725/48; 725/63
(58) Field of Classification Search .................. 725/142, 725/63, 37, 47, 48
See application file for complete search history.

(56) References Cited

U.S. PATENT DOCUMENTS

| | | | |
|---|---|---|---|
| 6,470,496 B1* | 10/2002 | Kato et al. ................... | 717/173 |
| 7,032,000 B2* | 4/2006 | Tripp ........................... | 709/202 |
| 7,080,400 B1* | 7/2006 | Navar .......................... | 725/139 |
| 7,548,565 B2* | 6/2009 | Sull et al. ..................... | 370/503 |
| 2002/0154892 A1* | 10/2002 | Hoshen et al. ................ | 386/87 |
| 2003/0204856 A1* | 10/2003 | Buxton ......................... | 725/120 |
| 2003/0226150 A1* | 12/2003 | Berberet et al. .............. | 725/94 |
| 2004/0258390 A1* | 12/2004 | Olson ........................... | 386/46 |
| 2005/0055685 A1* | 3/2005 | Maynard et al. ............. | 717/170 |
| 2005/0155075 A1* | 7/2005 | Crichton ....................... | 725/105 |
| 2006/0064716 A1* | 3/2006 | Sull et al. ..................... | 725/37 |
| 2006/0179121 A1* | 8/2006 | Kegoya et al. ................ | 709/217 |

FOREIGN PATENT DOCUMENTS

| | | |
|---|---|---|
| GB | 2434713 A | 8/2007 |
| JP | 4-319823 A | 11/1992 |
| JP | 11-161288 A | 6/1999 |
| JP | 11-298474 A | 10/1999 |
| JP | 11-331716 A | 11/1999 |
| JP | 2001-069444 A | 3/2001 |
| JP | 2002-112234 A | 4/2002 |
| JP | 2002-140541 A | 5/2002 |
| JP | 2002-141856 A | 5/2002 |
| JP | 2002-344926 A | 11/2002 |

(Continued)

OTHER PUBLICATIONS

Summary of Chijo Digital Television Hoso Unyo Kitei Gijutsu Shiryo (Terrestrial Digital Television Broadcasting Operation Rules Technical Material), ARIB TR-B14, pp. 1-5.

*Primary Examiner* — Joseph P Hirl
*Assistant Examiner* — Jivka Rabovianski
(74) *Attorney, Agent, or Firm* — Lerner, David, Littenberg, Krumholz & Mentlik, LLP (57) ABSTRACT

In a TS information sharing system, digital broadcast receivers and a digital-broadcast-compliant TV receive TS information separately and may transfer the received TS information to each other in a peer-to-peer manner or may transfer and store the received TS information into a server. Thus, the digital broadcast receivers and the digital-broadcast-compliant TV can retrieve, from the server, TS information that the digital broadcast receivers and/or the digital-broadcast-compliant TV have not yet received. The invention can be applied to a receiver for receiving terrestrial digital broadcasts.

12 Claims, 5 Drawing Sheets

FOREIGN PATENT DOCUMENTS

| | | |
|---|---|---|
| JP | 2003-046958 A | 2/2003 |
| JP | 2003-061068 A | 2/2003 |
| JP | 2003-283978 A | 10/2003 |
| JP | 2004-165940 A | 6/2004 |
| JP | 2004-186962 A | 7/2004 |
| JP | 2004-282503 A | 10/2004 |
| JP | 2004-343427 A | 12/2004 |
| JP | 2005-039559 A | 2/2005 |

* cited by examiner

RECEIVER AND RECEIVING METHOD AND PROGRAM

CROSS-REFERENCE TO RELATED APPLICATIONS

The present application claims priority from Japanese Application No. 2003-314948 filed Sep. 8, 2003, the disclosure of which is hereby incorporated by reference herein.

BACKGROUND OF THE INVENTION

The present invention relates to a receiver and receiving method and program and, in particular, to a receiver and receiving method and program to be preferably used for receiving terrestrial digital broadcasts.

In television broadcasting in Japan, terrestrial digital waves (hereinafter called terrestrial digital broadcasts) recently have been used instead of conventional analog terrestrial waves.

In BS digital broadcasting and CS digital broadcasting through satellites, AV data corresponding to images and sounds of multiple channels and attribute data (such as an Event Information Table (EIT) including program names, broadcast dates and program details and a Common Data Table (CDT) including information commonly required by all receivers, such as logo marks of broadcasters) of multiple channels are multiplexed into one transport stream (TS).

On the other hand, in terrestrial digital broadcasting, one TS only includes AV data corresponding to images and sounds of one channel (called network in terrestrial digital broadcasting) and attribute data on the network (hereinafter called TS information) (as disclosed in "Chijo Digital Television Hoso Unyo Kitei Gijutsu Shiryo (Terrestrial Digital Television Broadcasting Operation Rules Technical Material) ARIB TR-B14)).

Therefore, for example, in order to display a program table of programs to be provided at the same time from multiple different networks by using TS information received by a receiver, processing to retrieve TS information of the multiple different networks is required. The processing may be implemented by using multiple tuners in the receivers.

However, a method of sequentially switching frequencies to receive has problems that frequencies to receive cannot be switched while a user is viewing a program from one network, for example, and that, even if a user allows the switching of frequencies to receive, time is required until multiple pieces of TS information corresponding to multiple different networks are retrieved.

Furthermore, the method in which multiple tuners are contained in a receiver has a problem of an increase in costs of the receiver.

The invention was made in view of these matters, and it is an object of the invention to allow the quick retrieval of multiple pieces of TS information corresponding to multiple different networks in terrestrial digital broadcasts.

SUMMARY OF THE INVENTION

According to an aspect of the invention, there is provided a receiver including a receiving unit operable to receive multiple frequencies and to receive broadcast signals including data relating to broadcast details; an extracting unit operable to extract the data from the broadcast signals; a storing unit operable to store the data; a communication unit operable to communicate with another receiver through an information network, the another receiver having a function which is the same as that of the receiver; a judging unit operable to determine whether all of the data corresponding to the multiple frequencies receivable by the receiving unit is stored in the storing unit; a notifying unit operable to notify the another receiver of identification information for identifying a portion of the data when the portion of the data is not stored in the storing unit; and a retrieving unit operable to retrieve the portion of the data from the another receiver and to store the retrieved portion of the data in the storing unit. The receiver may also include a supplying unit operable to supply the data stored in the storing unit to the another receiver.

In this case, the broadcast signals may be terrestrial digital broadcast signals, and the data relating to the broadcast details may be transport signals.

The transport signals may include a network ID by which a network of terrestrial digital broadcasts can be identified.

Preferably, the communication unit includes a server. The notifying unit may notify the server of the identification information for identifying the portion of the data when the portion of the data is not stored in the storing unit. The retrieving unit may also retrieve the portion of the data from the server and store the portion of the data retrieved from the server in the storing unit. The supplying unit also may supply the data stored in the storing unit to the server.

According to another aspect of the invention, there is provided a method for receiving broadcast signals in a receiver operable to receive multiple frequencies, the broadcast signals including data relating to broadcast details, the method including determining whether all of the data corresponding to the multiple frequencies receivable by the receiver are stored in the receiver; notifying another receiver having a function which is the same as that of the receiver of identification information for identifying a portion of the data when the portion of the data is not stored in the receiver; and retrieving the portion of the data from the another receiver and storing the received portion of the data in the receiver. The method may further include supplying the data stored in the receiver to the another receiver.

According to another aspect of the invention, there is provided a recording medium recorded with a program for causing a computer to implement a method for receiving broadcast signals in a receiver operable to receive multiple frequencies, the broadcast signals including data relating to broadcast details, the method including determining whether all of the data corresponding to the multiple frequencies receivable by the receiver are stored in the receiver; notifying another receiver having a function which is the same as that of the receiver of identification information for identifying a portion of the data when the portion of the data is not stored in the receiver; and retrieving the portion of the data from the another receiver and storing the received portion of the data in the receiver. The method may further include supplying the data stored in the receiver to the another receiver.

According to the invention, even when all of the data corresponding to the multiple frequencies receivable by a receiving unit are not held in one receiver, identification information for identifying the portion of the data which is not held in the one receiver is notified to another receiver. In response to the notification, the portion of the data is retrieved from the another receiver and is held in the one receiver. Therefore, for example, multiple pieces of TS information corresponding to multiple different networks in terrestrial digital broadcasts can be retrieved quickly by any receiver.

DETAILED DESCRIPTION

Before describing an embodiment of the invention, the correspondence between elements recited in the claims and specific examples in the embodiment of the invention will be described. The description is for understanding that specific examples supporting the invention according to the claims are included in the embodiment of the invention. Therefore, if specific examples are included in the embodiment of the invention but are not written here as ones corresponding to the claim elements, that fact does not mean that the specific examples do not correspond to the claim elements. Conversely, if specific examples are written as ones corresponding to the claim elements, that fact does not mean that the specific examples do not correspond to elements other than the claim elements.

Furthermore, the description below does not mean that all aspects of the invention corresponding to the specific examples included in the embodiment of the invention are written in the claims. In other words, the description below relates to aspects of the invention corresponding to the specific examples included in the embodiment of the invention and does not mean there are no inventions which are not written in the claims of this application, that is, the existence of inventions to be divisionally applied for and/or added by amendment.

A receiver (such as a digital broadcast receiver 1-1 in FIG. 1) comprising:
- a receiving unit operable to receive multiple frequencies, and to receive broadcast signals (such as terrestrial digital broadcast signals) including data (such as TS information) relating to broadcast details;
- an extracting unit operable to extract the data from the broadcast signals;
- a storing unit operable to store the data;
- a communication unit (such as a communication portion 16 in FIG. 2) operable to communicate with another receiver (such as a digital broadcast receiver 1-2 in FIG. 1) through an information network, the another receiver having a function which is the same as that of the receiver;
- a judging unit (such as a control portion 11 in FIG. 2 for performing a step S1 in FIG. 4) operable to determine whether all of the data corresponding to the multiple frequencies receivable by the receiving unit is stored in the storing unit;
- a notifying unit (such as the communication portion 16 in FIG. 2 for performing a step S4 in FIG. 4) operable to notify the another receiver of identification information (such as a network ID) for identifying a portion of the data when the portion of the data is not stored in the storing unit; and
- a retrieving unit (such as the control portion 11 in FIG. 2 for performing a step S6 in FIG. 4) operable to retrieve the portion of the data from the another receiver and to store the retrieved portion of the data in the storing unit.

The receiver may further comprise a supplying unit (such as the control portion 11 in FIG. 2 for performing a step S5 in FIG. 4) operable to supply the data stored in the storing unit to the another receiver.

Figure 4:
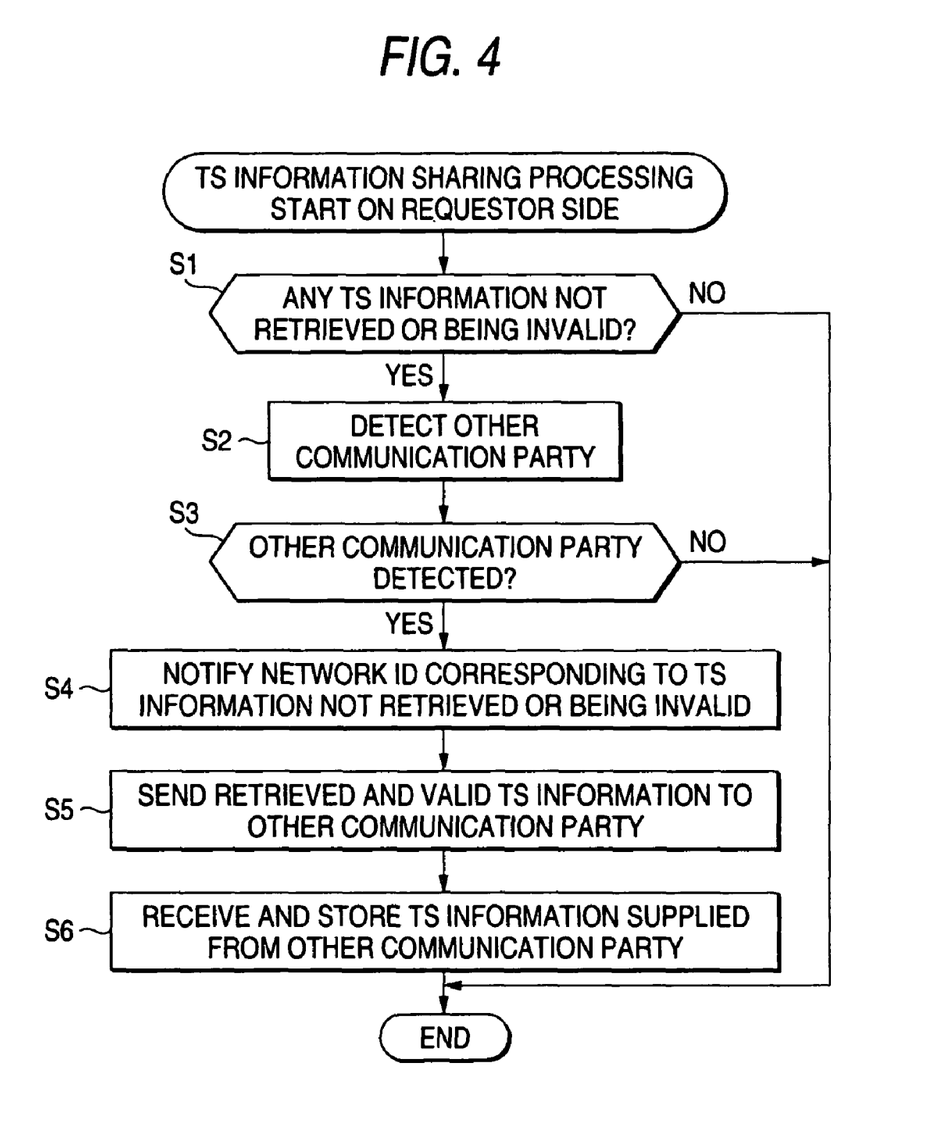
FIG. 4 is a flowchart illustrating TS information sharing processing on a requester side by a digital broadcast receiver according to the invention.

A method for receiving broadcast signals in a receiver operable to receive multiple frequencies, the broadcast signals including data relating to broadcast details, the method comprising:
- determining whether all of the data corresponding to the multiple frequencies receivable by the receiver are stored in the receiver (such as step S1 in FIG. 4);
- notifying another receiver having a function which is the same as that of the receiver of identification information for identifying a portion of the data when the portion of the data is not stored in the receiver (such as step S4 in FIG. 4); and
- retrieving the portion of the data from the another receiver and storing the received portion of the data in the receiver (such as step S6 in FIG. 4).

The method may further comprise supplying the data stored in the receiver to the another receiver (such as step S5 in FIG. 4).

The correspondence between elements written in the claims relating to a program according to the invention and specific examples according to the embodiment of the invention are similar to those of the receiving method according to the invention. Therefore, the description will be omitted here.

Figure 1:
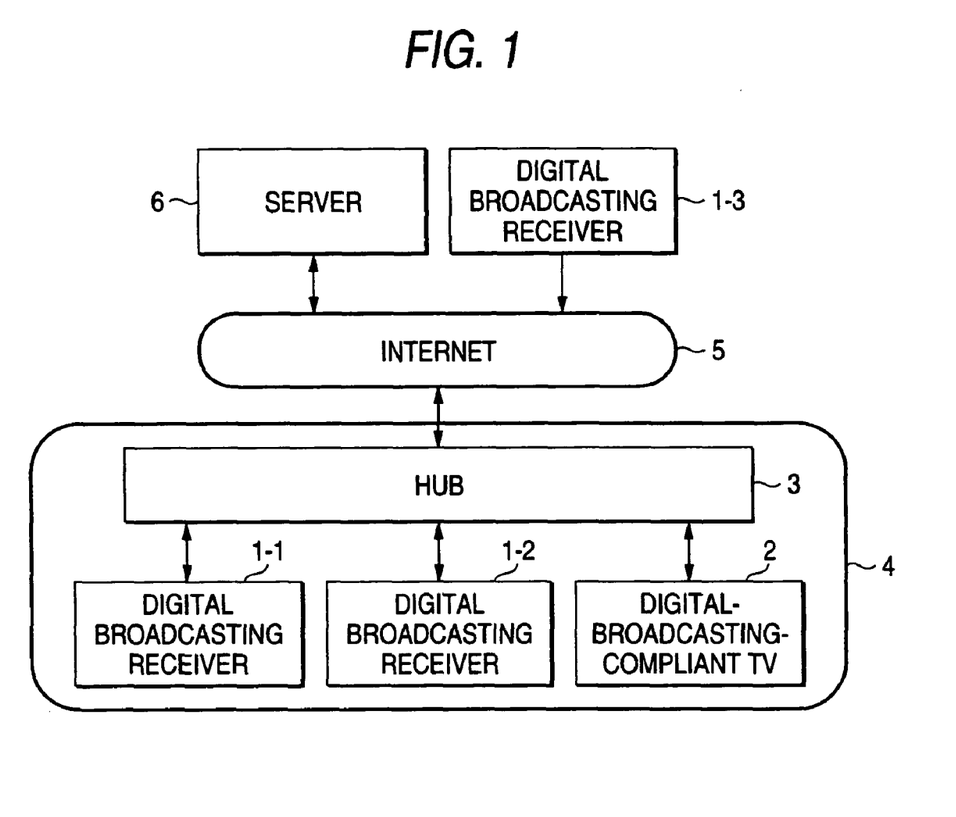
FIG. 1 is a block diagram showing a construction example of a TS information sharing system including a digital broadcast receiver according to the invention.

Now, a digital broadcast receiver according to the invention will be described. FIG. 1 shows a construction example of a TS information sharing system including digital broadcast receivers according to the invention. The TS information sharing system includes a Local Area Network (LAN) 4, a server 6, and a digital broadcast receiver 1-3. The LAN 4 includes digital broadcast receivers 1-1 and 1-2 (which will be simply called digital broadcast receivers 1 when no distinction is necessary therebetween), and a digital-broadcast-compliant television receiver (digital-broadcast-compliant TV) 2, which are connected through a hub 3. The digital-broadcast-compliant TV 2 self-contains an equivalent tuner to that of the digital broadcast receivers 1. The server 6 is connected to the LAN 4 over the Internet 5.

In the TS information sharing system, the digital broadcast receivers 1-1 to 1-3 and the digital-broadcast-compliant TV 2 receive TS information separately and may transfer the received TS information to each other in a peer-to-peer manner or may transfer and store the received TS information into the server 6. Thus, the digital broadcast receivers 1-1 to 1-3 and the digital-broadcast-compliant TV 2 can retrieve, from the server 6, TS information that the digital broadcast receivers 1-1 to 1-3 and/or the digital-broadcast-compliant TV 2 have not yet received.

TS information to be communicated in the TS information sharing system may be a part of an EIT including program names, broadcast dates and program details and/or a CDT including information commonly required by all receivers, such as logo marks of broadcasters.

In the LAN 4 and the Internet 5, predetermined data is communicated based on Internet Protocol (IP: Requests For Comments (RFC 791)).

Figure 2:
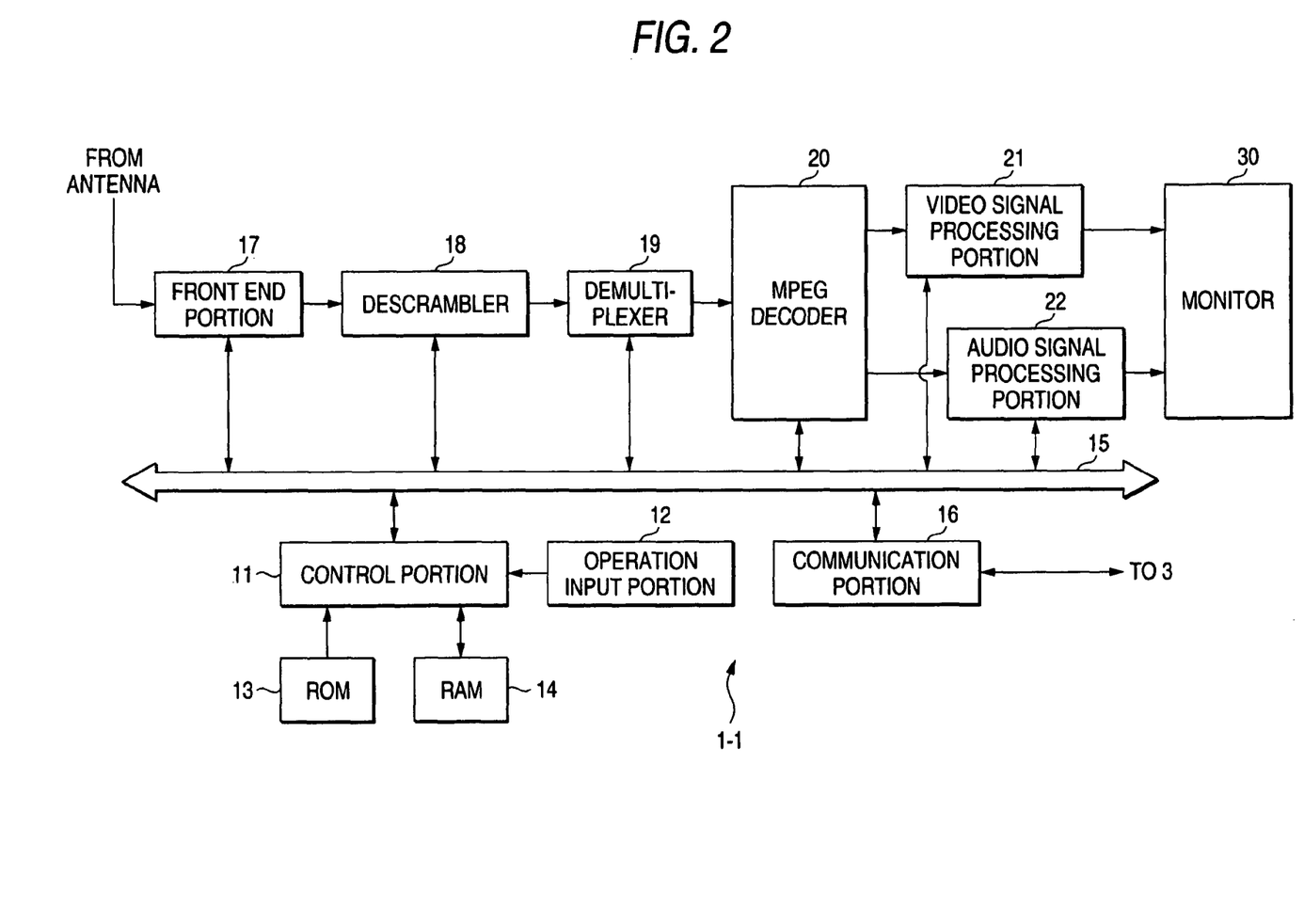
FIG. 2 is a block diagram showing a construction example of a digital broadcast receiver according to the invention.

Next, FIG. 2 shows a construction example of the digital broadcast receiver 1-1. An operation input portion 12, a ROM 13 and a RAM 14 are connected to a control portion 11. In response to a manipulation by a user, the operation input portion 12 creates an operation command corresponding thereto. The ROM 13 stores a control program. The RAM 14 stores different kinds of data. A communication portion 16 to a voice signal processing portion 22 are connected to the control portion 11 through a bus 15.

The control portion 11 controls the components of the digital broadcast receiver 1-1 in accordance with an operation command input from the operation input portion 12 based on the control program stored in the ROM 13. The retrieved TS information is stored in the RAM 14. The RAM 14 stores a TS information holding state table 41 (FIG. 3) indicating the presence of TS information in the RAM 14. The control portion 11 updates the TS information holding state table 41 of the RAM 14 every time TS information is retrieved. The control portion 11 further controls components of the digital broadcast receiver 1-1 such that TS information not retrieved can be retrieved from the digital broadcast receiver 1-2 and/or the digital-broadcast-compliant TV 2 in the LAN 4, the server 6 or the digital broadcast receiver 1-3, for example, on the Internet 5 based on the TS information holding state table 41 in the RAM 14.

Figure 3:
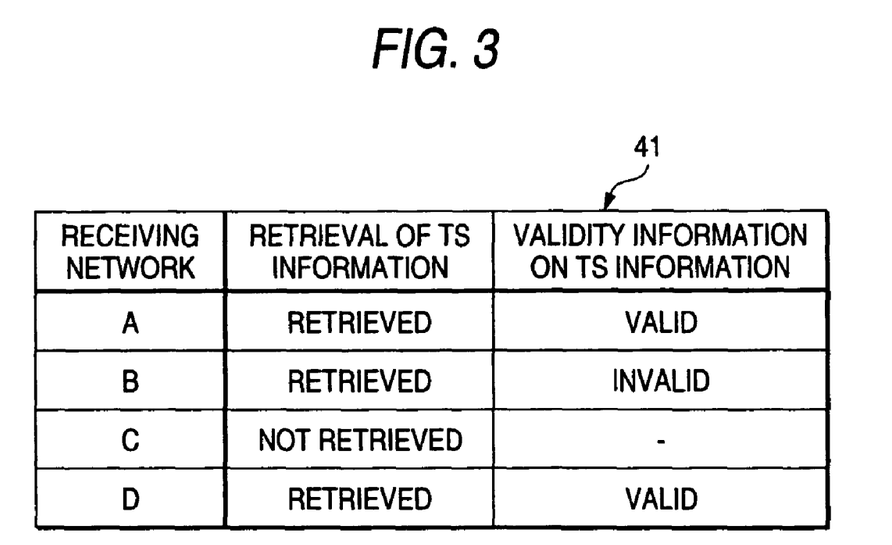
FIG. 3 is a diagram showing an example of a TS information holding state table stored in the RAM in FIG. 2.

FIG. 3 shows an example of the TS information holding state table 41 stored in the RAM 14. The TS information holding state table 41 stores flags indicating whether given TS information has been retrieved from networks from which the digital broadcast receiver 1-1 is defined to receive the TS information and information indicating the validity of retrieved TS information (which may be a one-bit flag, a received date or an expiration date).

Referring back to FIG. 2, the communication portion 16 communicates TS information based on IP with the digital broadcast receiver 1-2 and/or digital-broadcast-compliant TV 2 in the LAN 4 or the server 6 or digital broadcast receiver 1-3 on the Internet 5. Under the control of the control portion 11, the front end portion 17 extracts a TS corresponding to a station selected by a user from an output from an antenna and outputs the TS to the descrambler 18. The descrambler 18 appropriately descrambles the TS input from the front end portion 17 and outputs the TS to the demultiplexer 19. The demultiplexer 19 demultiplexes video data and voice data from the TS input from the descrambler 18 and outputs the video data and voice data to the MPEG decoder 20. The demultiplexer 19 demultiplexes TS information from the TS input from the descrambler 18 and outputs the TS information to the control portion 11 through the bus 15.

The MPEG decoder 20 decodes the video data and voice data input from the demultiplexer 19 and outputs the resulting video signals and voice signals to the video signal processing portion 21 and the voice signal processing portion 22, respectively. The video signal processing portion 21 performs predetermined image processing on the video signals input from the MPEG decoder 20 and outputs the result to the monitor 30. The voice signal processing portion 22 performs predetermined voice processing on the voice signals input from the MPEG decoder 20 and outputs the result.

Since construction examples of the digital broadcast receivers 1-2 and 1-3 are the same as that of the digital broadcast receiver 1-1, the description will be omitted. Furthermore, the tuner contained in the digital-broadcast-compliant TV 2 has the same construction as that of the digital broadcast receiver 1-1.

Next, the processing by the digital broadcast receiver 1-1 to retrieve TS information, which has not been retrieved previously by the digital broadcast receiver 1-1, from another apparatus in the TS information sharing system (hereinafter called requester side TS information sharing processing) will be described with reference to the flowchart in FIG. 4. The requestor side TS information sharing processing is performed at predetermined intervals (such as every several minutes to several hours).

At step S1, with reference to the TS information holding state table 41 in the RAM 14, the control portion 11 determines whether any TS information, which has not been retrieved previously or which has been retrieved but is invalid, exists among the TS information corresponding to networks (such as networks assigned to numeric buttons on a remote controller (not shown)) corresponding to the multiple receivable frequencies. If it is determined that no TS information, which has not been retrieved previously or which has been retrieved but is invalid, exists among the TS information corresponding to the receivable networks, valid TS information corresponding to the receivable networks is held in the RAM 14. Therefore, the requestor-side TS information sharing processing ends.

At step S1, if it is determined that TS information, which has not been retrieved previously or which has been retrieved but is invalid, exists among the TS information corresponding to the receivable networks, the processing goes to step S2. At step S2, the communication portion 16 starts detecting the other communication party (digital broadcast receiver 1-2 or 1-3, the digital-broadcast-compliant TV 2 or the server 6) on the LAN 4 or the Internet 5 under the control of the control portion 11. At step S3, the control portion 11 determines whether the communication portion 16 could detect the other communication party. Here, if it is determined that the other communication party could not be detected, the requestor-side TS information sharing processing ends.

If it is determined that the other communication party could be detected at step S3, the processing advances to step S4. It is assumed below that the digital broadcast receiver 1-2 was detected. At step S4, the communication portion 16, under the control of the control portion 11, notifies the detected digital broadcast receiver 1-2 of a network ID for identifying the network from which TS information has not been retrieved previously or has been retrieved but is invalid.

In response to the notification, when the digital broadcast receiver 1-2 holds valid TS information corresponding to the notified network ID, the digital broadcast receiver 1-2 sends the TS information to the digital broadcast receiver 1-1. The processing in the digital broadcast receiver 1-2 will be described later with reference to the flowchart in FIG. 5.

At step S5, the communication portion 16, under the control of the control portion 11, sends valid TS information held in the RAM 14 to the digital broadcast receiver 1-2. Step S5 may be omitted but is performed as much as possible when the other communication party is the server 6. Thus, the server 6 can store many pieces of valid TS information.

At step S6, the communication portion 16 receives the TS information supplied from the digital broadcast receiver 1-2 and outputs the TS information to the control portion 11 through the bus 15. The control portion 11 stores the input TS information into the RAM 14 and updates the TS information holding state table 41 in the RAM 14 in accordance with the input TS information. Upon completion of these steps, the requestor-side TS information sharing processing ends.

The periodic execution of the requestor-side TS information sharing processing as described above can store valid TS information corresponding to receivable networks in the RAM 14 of the digital broadcast receiver 1-1. Thus, for example, in accordance with a user's manipulation to command the display of a program table and so on of an unselected network, the program table and so on can be displayed quickly.

However, in the requestor-side TS information sharing processing, when the digital broadcast receiver 1-2, which is the other communication party, does not hold valid TS information corresponding to the network ID notified by the digital broadcast receiver 1-1, the digital broadcast receiver 1-2 cannot supply the TS information. Therefore, at step S2, the digital broadcast receiver 1-1 may detect a communication party holding the desired TS information.

Figure 5:
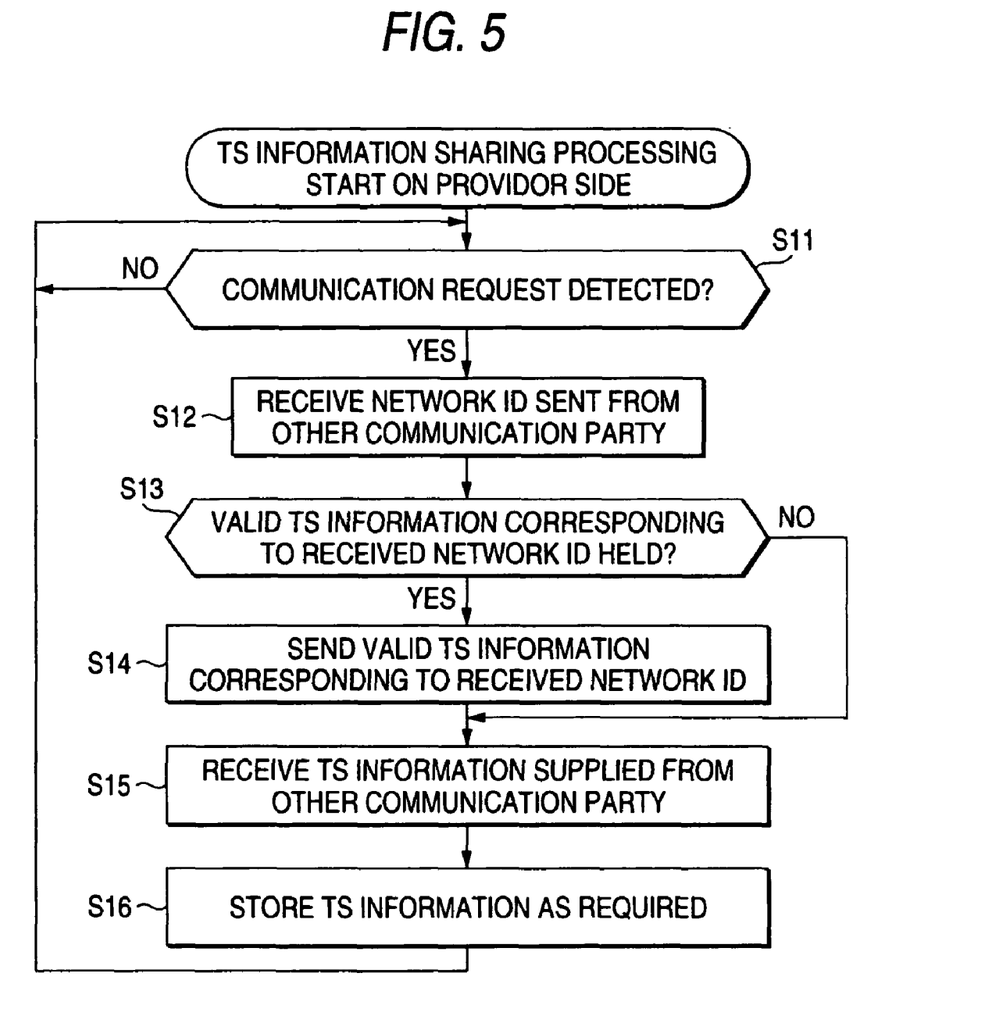
FIG. 5 is a flowchart illustrating TS information sharing processing on a supplier side by a digital broadcast receiver according to the invention.

Next, the processing by the digital broadcast receiver 1-2 will be described with reference to the flowchart in FIG. 5. In this processing, the digital broadcast receiver 1-2, which is the other communication party, supplies TS information retrieved by the digital broadcast receiver 1-2 in accordance with a request from another apparatus (digital broadcast receiver 1-1 in this case) in the TS information sharing system (hereinafter called supplier-side TS information sharing processing).

At step S11, the communication portion 16 of the digital broadcast receiver 1-2 waits until a communication is requested by another apparatus in the TS information sharing system (which is equivalent to step S2 in FIG. 4). If a communication is requested, the processing goes to step S12. In this case, it is assumed that a communication was requested by the digital broadcast receiver 1-1. At step S12, the communication portion 16 receives a network ID sent from the digital broadcast receiver 1-1 requesting a communication.

At step S13, the control portion 11 determines whether valid TS information corresponding to the received network ID is held with reference to the TS information holding state table 41 in the RAM 14. If it is determined that valid TS information corresponding to the received network ID is held, the processing goes to step S14. At step S14, the communication portion 16, under the control of the control portion 11, sends the valid TS information corresponding to the received network ID, which is held in the RAM 14, to the digital broadcast receiver 1-1.

At step S15, the communication portion 16 receives the TS information from the digital broadcast receiver 1-1 to perform step S5 in FIG. 4 and outputs the TS information to the control portion 11 through the bus 15. Here, the reception of the TS information sent from the digital broadcast receiver 1-1 may be denied.

At step S16, the control portion 11 holds the supplied TS information in the RAM 14 as required. More specifically, when the supplied TS information corresponds to a network defined to receive but has not yet been retrieved or is newer than the retrieved TS information, the control portion 11 stores the TS information in the RAM 14. After that, the processing returns to step S11, and the subsequent steps are repeated.

If it is determined at step 13 that valid TS information corresponding to the received network ID is not held, step S14 is skipped. The description of the supplier-side TS information sharing processing ends here.

Notably, in the supplier-side TS information sharing processing, if the digital broadcast receiver 1-2 does not hold valid TS information corresponding to the network ID notified by the digital broadcast receiver 1-1, the digital broadcast receiver 1-2 cannot supply the TS information. Then, the digital broadcast receiver 1-2 may search another apparatus holding valid TS information corresponding to the network ID notified by the digital broadcast receiver 1-1, retrieve the TS information therefrom and supply the TS information to the digital broadcast receiver 1-1.

The digital broadcast receiver 1-2 performs the supplier-side TS information sharing processing in parallel with the requestor-side TS information sharing processing. Conversely, the digital broadcast receiver 1-1 also performs the requestor-side TS information sharing processing in parallel with the supplier-side TS information sharing processing. This is also true for the digital broadcast receiver 1-3 and the digital-broadcast-compliant TV 2.

The invention can be applied to a television receiver, a personal computer and so on in addition to this embodiment.

In this specification, a step of describing a program includes the steps to be performed sequentially in the described order and the steps to be performed not sequentially but in parallel or separately.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A receiver, comprising:
   a receiving unit operable to receive broadcast signals including at least one of image data or audio data, and data relating to broadcast network details, on multiple frequencies via broadcast networks;
   an extracting unit operable to extract the data from the broadcast signals;
   a storing unit operable to store the data;
   a communication unit operable to communicate with another receiver through an information network;
   a judging unit operable to determine whether all of the data relating to broadcast network details corresponding to the multiple frequencies receivable by the receiving unit is stored in the storing unit, wherein the data relating to broadcast network details includes at least one of content name, broadcast data, content details and logo marks of broadcasters;
   a notifying unit operable to notify the another receiver of identification information for identifying a portion of the data relating to broadcast network details not stored in the storing unit when the portion of the data relating to broadcast network details corresponding to one or more frequencies of the multiple frequencies is not stored in the storing unit; and
   a retrieving unit operable to retrieve the portion of the data relating to broadcast network details not stored in the storing unit from the another receiver and to store the retrieved data relating to broadcast network details in the storing unit,
   wherein the storing unit is operable to store both the data relating to broadcast details via a broadcast network and the data relating to broadcast details via an information network in a peer-to-peer manner, and wherein each of the data further includes a relationship information between an audio/visual content broadcast and a broadcast network.

2. A receiver according to claim 1, further comprising a supplying unit operable to supply the data stored in the storing unit to the another receiver.

3. A receiver according to claim 1, wherein the broadcast signals are terrestrial digital broadcast signals, and the data relating to the broadcast details are transport signals.

4. A receiver according to claim 3, wherein the transport signals include a network ID by which a network of terrestrial digital broadcasts can be identified.

5. A receiver according to claim 1, wherein the information network includes a server;
   the notifying unit notifies the receiver of the identification information for identifying the portion of the data when the portion of the data is not stored in the storage unit;

the retrieving unit retrieves the portion of the data from the server and stores the portion of the data retrieved from the server in the storing unit; and the supplying unit supplies the data stored in the storing unit to the server.

6. The receiver according to claim 1, wherein the data relating to broadcast details corresponding to one of the multiple frequencies is broadcasted in the corresponding frequency.

7. A method for receiving signals in a receiver, the method comprising:

receiving broadcast signals including at least one of image data or audio data, and data relating to broadcast network details, on multiple frequencies via broadcast networks;

determining whether all of the data relating to broadcast network details corresponding to the multiple frequencies receivable by the receiver are stored in the receiver, wherein the data relating to broadcast network details includes at least one of content name, broadcast data, content details and logo marks of broadcasters;

notifying another receiver having a function which is the same as that of the receiver of identification information for identifying a portion of the data relating to broadcast network details not stored in the receiver when the portion of the data relating to broadcast network details corresponding to one or more frequencies of the multiple frequencies is not stored in the receiver; and retrieving the portion of the data relating to broadcast network details not stored in the receiver from the another receiver and storing the retrieved data relating to broadcast network details in the receiver, wherein the receiver is operable to store both the data relating to broadcast details via a broadcast network and the data relating to broadcast details via an information network in a peer-to-peer manner, and wherein each of the data further includes relationship information between an audio/visual content broadcast and a broadcast network.

8. The method as claimed in claim 7, further comprising supplying the data stored in the receiver to the another receiver.

9. The method according to claim 7, wherein the data relating to broadcast details corresponding to one of the multiple frequencies is broadcasted in the corresponding frequency.

10. A recording medium recorded with a program for causing a computer to implement a method for receiving signals in a receiver, the method comprising:

receiving broadcast signals including at least one of image data or audio data, and data relating to broadcast network details, on multiple frequencies via broadcast networks;

determining whether all of the data relating to broadcast network details corresponding to the multiple frequencies receivable by the receiver are stored in the receiver, wherein the data relating to broadcast network details includes at least one of content name, broadcast data, content details and logo marks of broadcasters;

notifying another receiver having a function which is the same as that of the receiver of identification information for identifying a portion of the data relating to broadcast network details not stored in the receiver when the portion of the data relating to broadcast network details corresponding to one or more frequencies of the multiple frequencies is not stored in the receiver;

supplying the data stored in the receiver to the another receiver; and retrieving the portion of the data relating to broadcast network details not stored in the receiver from the another receiver and storing the retrieved data relating to broadcast network details in the receiver, wherein the receiver is operable to store both the data relating to broadcast details via a broadcast network and the data relating to broadcast details via an information network in a peer-to-peer manner, and wherein each of the data further includes relationship information between an audio/visual content broadcast and a broadcast network.

11. The recording medium as claimed in claim 10, wherein the method further comprises supplying the data stored in the receiver to the another receiver.

12. The recording medium according to claim 10, wherein the data relating to broadcast details corresponding to one of the multiple frequencies is broadcasted in the corresponding frequency.

* * * * *